(12) United States Patent
Armstrong

(10) Patent No.: US 8,665,536 B2
(45) Date of Patent: Mar. 4, 2014

(54) EXTERNAL BEAM DELIVERY SYSTEM FOR LASER DARK-FIELD ILLUMINATION IN A CATADIOPTRIC OPTICAL SYSTEM

(75) Inventor: J. Joseph Armstrong, Milpitas, CA (US)

(73) Assignee: KLA-Tencor Corporation, Milpitas, CA (US)

(*) Notice: Subject to any disclaimer, the term of this patent is extended or adjusted under 35 U.S.C. 154(b) by 0 days.

(21) Appl. No.: 11/977,998

(22) Filed: Oct. 25, 2007

(65) Prior Publication Data
US 2010/0149662 A1    Jun. 17, 2010

Related U.S. Application Data

(60) Provisional application No. 60/936,451, filed on Jun. 19, 2007.

(51) Int. Cl.
*G02B 17/08* (2006.01)

(52) U.S. Cl.
CPC ..................... *G02B 17/0856* (2013.01)
USPC ............................ 359/732; 359/726; 359/365

(58) Field of Classification Search
CPC .................. G02B 17/0856; G02B 17/086
USPC ......... 359/726–729, 732, 737, 656–661, 364, 359/365; 356/237.1–237.5
See application file for complete search history.

(56) References Cited

U.S. PATENT DOCUMENTS

| | | |
|---|---|---|
| 1,973,066 A | 9/1934 | Hauser et al. |
| 2,661,658 A | 12/1953 | Dyson |
| 3,237,515 A | 3/1966 | Altman |
| 3,529,888 A * | 9/1970 | Buchroeder .................. 359/686 |
| 3,897,133 A * | 7/1975 | Warner et al. ................. 359/730 |
| 4,155,630 A | 5/1979 | Ih |
| 4,511,220 A | 4/1985 | Scully |
| 4,647,158 A | 3/1987 | Yeadon |
| 4,758,088 A | 7/1988 | Doyle |
| 4,779,966 A | 10/1988 | Friedman |
| 4,795,244 A | 1/1989 | Uehara |
| 4,898,471 A | 2/1990 | Vaught et al. |

(Continued)

FOREIGN PATENT DOCUMENTS

| | | |
|---|---|---|
| DE | 108181 | 1/1900 |
| DE | 3742806 A | 7/1989 |

(Continued)

OTHER PUBLICATIONS

Geary, Joseph M. Introduction to Lens Design: with Practical ZEMAX Examples. Richmond, VA: Willmann-Bell, 2002. p. 23. Print.*

(Continued)

*Primary Examiner* — Zachary Wilkes
(74) *Attorney, Agent, or Firm* — Smyrski Law Group, A P.C.

(57) ABSTRACT

A catadioptric objective configured to inspect a specimen is provided. The catadioptric objective includes a Mangin element having one surface at a first axial location and an extension element positioned together with the Mangin element. The extension element provides a second surface at a second axial location. Certain light energy reflected from the specimen passes to the second surface of the extension element, the Mangin element, and through a plurality of lenses. An aspheric surface may be provided, and light energy may be provided to the specimen using diverting elements such as prisms or reflective surfaces.

26 Claims, 10 Drawing Sheets

(56) References Cited

U.S. PATENT DOCUMENTS

| | | |
|---|---|---|
| 4,971,428 A | 11/1990 | Moskovich |
| 4,974,094 A | 11/1990 | Morito |
| 5,031,976 A | 7/1991 | Shafer |
| 5,089,913 A | 2/1992 | Singh et al. |
| 5,114,238 A | 5/1992 | Sigler |
| 5,140,459 A | 8/1992 | Sagan |
| 5,162,939 A | 11/1992 | Herron et al. |
| 5,177,559 A | 1/1993 | Batchelder et al. |
| 5,233,460 A | 8/1993 | Partlo |
| 5,264,912 A | 11/1993 | Vaught et al. |
| 5,274,494 A | 12/1993 | Rafanelli et al. |
| 5,309,456 A | 5/1994 | Horton |
| 5,323,263 A | 6/1994 | Schoenmakers |
| 5,337,170 A | 8/1994 | Khoury et al. |
| 5,428,442 A | 6/1995 | Lin et al. |
| 5,434,662 A | 7/1995 | Rockwell et al. |
| 5,488,229 A | 1/1996 | Elliott et al. |
| 5,515,207 A | 5/1996 | Foo |
| 5,621,529 A | 4/1997 | Gordon et al. |
| 5,636,066 A | 6/1997 | Takahashi |
| 5,644,140 A | 7/1997 | Biedermann et al. |
| 5,668,673 A | 9/1997 | Suenaga et al. |
| 5,717,518 A | 2/1998 | Shafer et al. |
| 5,729,374 A | 3/1998 | Tiszauer et al. |
| 5,805,334 A | 9/1998 | Takahashi |
| 5,805,357 A | 9/1998 | Omura |
| 5,808,797 A | 9/1998 | Bloom et al. |
| 5,808,805 A | 9/1998 | Takahashi |
| 5,835,275 A | 11/1998 | Takahashi et al. |
| 5,849,468 A | 12/1998 | Sawyer |
| 5,851,740 A | 12/1998 | Sawyer |
| 5,861,997 A | 1/1999 | Takahashi |
| 5,880,891 A | 3/1999 | Furter |
| 5,990,983 A | 11/1999 | Hargis et al. |
| 5,999,310 A | 12/1999 | Shafer et al. |
| 6,064,517 A | 5/2000 | Chuang et al. |
| 6,191,887 B1 | 2/2001 | Michaloski et al. |
| 6,201,601 B1 * | 3/2001 | Vaez-Iravani et al. ..... 356/237.4 |
| 6,275,514 B1 | 8/2001 | Katzir et al. |
| 6,370,178 B1 | 4/2002 | Papayoanou et al. |
| 6,392,793 B1 | 5/2002 | Chuang et al. |
| 6,512,631 B2 | 1/2003 | Shafer et al. |
| 6,548,797 B1 | 4/2003 | Ai |
| 6,560,011 B2 | 5/2003 | Chuang et al. |
| 6,606,153 B2 * | 8/2003 | Marxer et al. .............. 356/237.3 |
| 6,801,357 B2 | 10/2004 | Shafer et al. |
| 6,842,298 B1 | 1/2005 | Shafer et al. |
| 7,035,001 B2 | 4/2006 | Chuang et al. |
| 7,136,159 B2 | 11/2006 | Tsai et al. |
| 7,136,234 B2 | 11/2006 | Shafer et al. |
| 7,180,658 B2 | 2/2007 | Shafer et al. |
| 7,187,500 B2 | 3/2007 | Chuang et al. |
| 7,564,633 B2 * | 7/2009 | Webb ........................... 359/727 |
| 2002/0163728 A1 * | 11/2002 | Myers .......................... 359/613 |
| 2005/0152027 A1 | 7/2005 | Armstrong et al. |
| 2006/0238856 A1 | 10/2006 | Shafer et al. |
| 2007/0002465 A1 | 1/2007 | Chuang et al. |
| 2007/0024961 A1 | 2/2007 | Shafer et al. |
| 2007/0121107 A1 | 5/2007 | Tsai et al. |

FOREIGN PATENT DOCUMENTS

| | | |
|---|---|---|
| EP | 0798585 A2 | 10/1997 |
| GB | 2269024 A | 1/1994 |
| WO | WO 97/12226 | 4/1997 |
| WO | WO 99/08134 | 2/1999 |

OTHER PUBLICATIONS

Conical Frustum—from Wolfram MathWorld. Wolfram MathWorld: The Web's Most Extensive Mathematics Resource. Web. Jan. 9, 2012. <http://mathworld.wolfram.com/ConicalFrustum.html>.*

Melles Griot Catalogue. Barlow Scientific Group Ltd. USA, 1999 p. 6.2.*

Mallik, Proteep. "The Axion." Lecture. University of Arizona. Web. Jan. 28, 2013. <http://fp.optics.arizona.edu/opti696/2005/axicon_Proteep.pdf>.*

M.R. Bartz et al., "LED Print Analyzer," IBM Technical Disclosure Bulletin, vol. 14, No. 3, Aug. 1971.

D.S. Goodman, "Darkfield Illuminator Attachment," IBM Technical Disclosure Bulletin, vol. 27, No. 5, Oct. 1984.

J.L.C. Sanz et al., "Automated Visual Inspection with Dark-Field Microscopy," Journal of the Optical Society of America, Nov. 1985, USA, vol. 2, No. 11, pp. 1857-1862.

Carl Zeiss Brochure, "MSM 193 Microlithography Simulation Microscope," 1999.

* cited by examiner

EXTERNAL BEAM DELIVERY SYSTEM FOR LASER DARK-FIELD ILLUMINATION IN A CATADIOPTRIC OPTICAL SYSTEM

This application claims the benefit of U.S. Provisional Patent Application 60/936,451, entitled "External Beam Delivery System for Laser Dark-Field Illumination in a Catadioptric Optical System," inventor J. Joseph Armstrong, filed Jun. 19, 2007, the entirety of which is incorporated herein by reference.

BACKGROUND OF THE INVENTION

1. Field of the Invention

The present invention relates generally to the field of optical imaging, and more specifically to catadioptric optical systems used for bright-field and dark-field optical inspection applications.

2. Description of the Related Art

Many optical and electronic systems inspect surface features for defects such as those on a partially fabricated integrated circuit or a reticle. Defects may take the form of particles randomly localized on the surface, scratches, process variations such as under etching, etc. Such inspection techniques and apparatus are well known in the art and are embodied in various commercial products such as many of those available from KLA-Tencor Corporation of San Jose, Calif.

Several different imaging modes exist for optical inspection. These include bright-field and various dark-field imaging modes. Each of these imaging modes can detect different types of defects. The oblique dark-field mode is one of the most sensitive and stable dark-field modes. However, the requirements for a state of the art semiconductor inspection system include high numerical aperture (NA), large field size, reasonable bandwidth, and UV-DUV wavelength combined with the beam delivery and low scattering requirements for oblique dark-field, making finding a suitable design for advanced inspection very challenging.

Examples of optical systems that can support semiconductor inspection include high NA UV-DUV catadioptric systems with large field sizes are shown in U.S. Pat. No. 5,717, 518 by Shafer et al., and U.S. Pat. No. 6,064,517 by Chuang et al.

These previous designs can, in certain circumstances, exhibit beam delivery issues when performing oblique dark-field imaging. In these systems, one method for implementing the oblique dark-field mode uses a collimated beam of monochromatic light illuminating the wafer from inside the optical system within the NA defined by the objective. The problem with this technique is that small amounts of scattered and reflected light from lens elements in this design have the ability to produce noise at levels that compromise sensitivity. Laser illumination can be introduced near the pupil in the focusing lens group or from an alternate pupil location within the catadioptric group. These methods of illumination can cause a significant amount of back-scattered and reflected light from the multiple lens surfaces traversed by the illuminating light. Forward-scattered light from the specularly reflected component off the wafer is also a significant potential problem.

One previous method for achieving oblique laser dark-field illumination and imaging uses a collimated beam of monochromatic light to illuminate a semiconductor wafer from or originating outside the imaging objective. This mandates use of a long working distance objective to allow access by the laser to the area of interest on the semiconductor wafer. Objectives used in dark field applications of this type are generally refractive objectives limited to NAs less than 0.7, corresponding to collection angles of only up to 44 degrees from normal. A major drawback of this approach is the small imaging NA that limits the amount of scattered light that can be collected. Another drawback is the small spectral bandwidth and small field size that are typical of refractive UV-DUV objectives.

It would therefore be beneficial to provide a system that supports the oblique laser dark-field mode that overcomes drawbacks present in previously known imaging systems. Further, it would be beneficial to provide an optical inspection system design having improved functionality over devices exhibiting the negative aspects described herein.

SUMMARY OF THE INVENTION

According to one aspect of the present design, a catadioptric objective is provided. The catadioptric objective includes a Mangin element having one surface at a first axial location and an extension element positioned together with the Mangin element. The extension element provides a second surface at a second axial location. Certain light energy reflected from the specimen passes to the second surface of the extension element, the Mangin element, and through a plurality of lenses. An aspheric surface may be provided, and light energy may be provided to the specimen using diverting elements such as prisms or reflective surfaces.

These and other advantages of the present invention will become apparent to those skilled in the art from the following detailed description of the invention and the accompanying drawings.

DESCRIPTION OF THE DRAWINGS

The present invention is illustrated by way of example, and not by way of limitation, in the figures of the accompanying drawings in which.

DETAILED DESCRIPTION OF THE INVENTION

Figure 1:
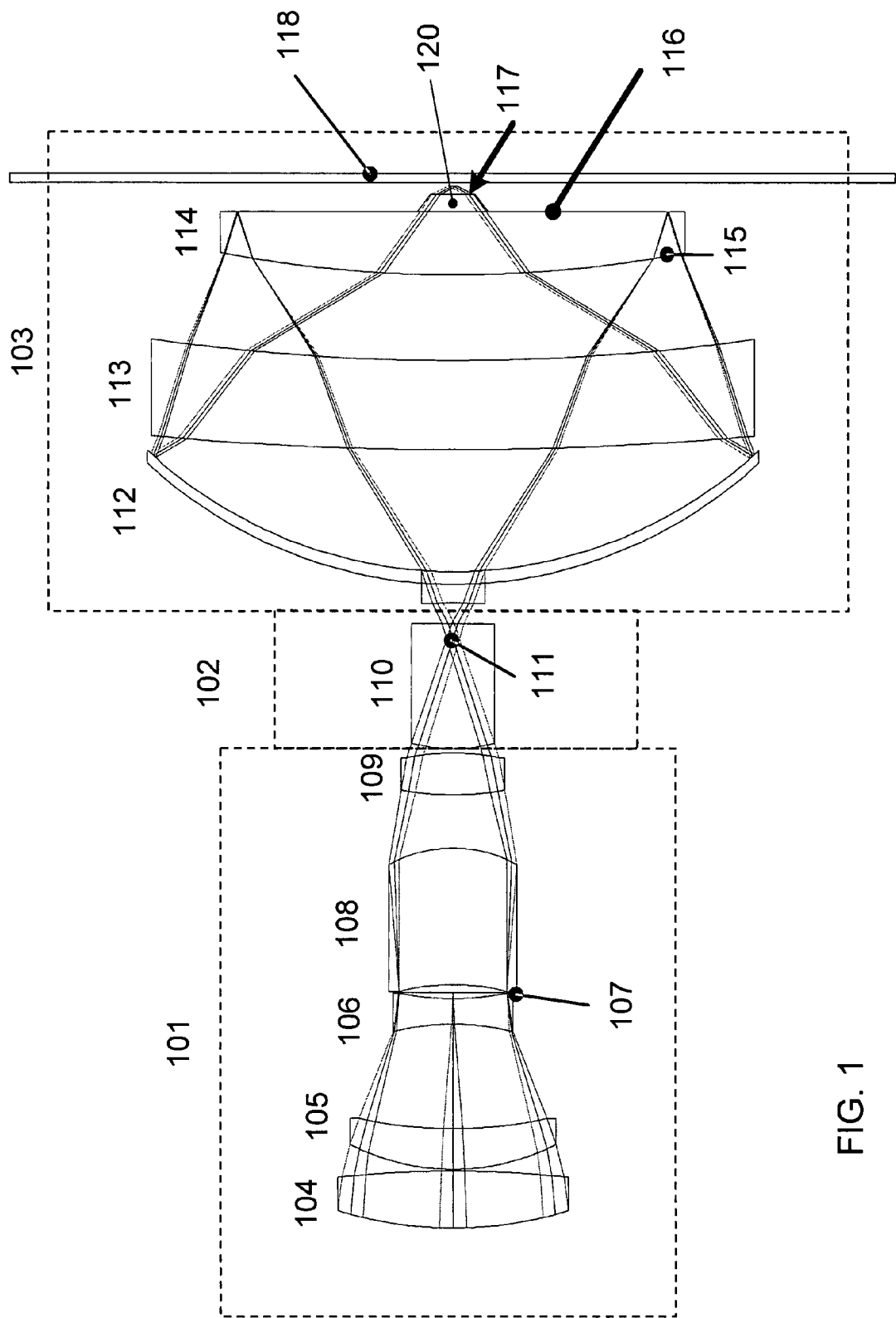
FIG. 1 is a catadioptric imaging system with a three surface Mangin element and 2 mm field suitable for use with external beam delivery.

The oblique laser dark-field mode enables the detection of defects that are below the resolution of the optical system. This technique relies on detecting light scattered from the defect. Flat areas that scatter very little light toward the detector result in a dark image. Any surface anomalies or features protruding above the object tend to scatter light toward the detector. Thus, in inspecting objects such as semiconductor wafers, dark-field imaging yields bright areas representing features, particles, or other irregularities on a dark background.

Scattered light from the defect collected by the imaging system is generally a very small percentage or portion of the illumination light. Any stray light collected by the imaging system and not produced by the defect makes the defect more difficult to distinguish. Semiconductor inspection in the current state of the art tends to employ designs that collect as much scattered light as possible while minimizing the amount of stray light collected. Thus designs must consider both the beam delivery system and the imaging optics. Collecting as much light as possible thus requires an imaging system with a high NA.

Shorter wavelength light also causes increased light scattering. The portion of scattered light tends to be much larger for UV or DUV wavelengths as compared with visible wavelengths. It can therefore be highly advantageous to perform oblique darkfield scattering using wavelengths in the UV-DUV spectral region. Further, semiconductor inspection of wafers or reticles is preferably performed as quickly as possible. Imaging systems with relatively large field sizes can scan wafers at higher speeds, and thus larger field sizes are beneficial.

UV-DUV optical designs with large field sizes and large NAs are typically limited to catadioptric systems. Previously, beam delivery with oblique illumination using catadioptric systems has been limited to "inside the lens" type beam delivery. Inside the lens beam delivery tends to produce large amounts of unwanted reflected and scattered light from the lens and mirror surfaces. In dark-field imaging, oblique incidence illumination results when the beam delivery components are aligned such that the specular reflection from the inspected surface is directed away from the imaging optics and is not collected. Both the illuminating light and the specularly reflected light are outside the objective lens so that scattering noise from the imaging optics is not a concern.

The present design is a device that can support both broadband bright-field inspection and oblique laser dark-field inspection techniques without compromising the performance of either technique. To accomplish this enhanced dual-mode inspection capability, both inspection techniques generally use the same imaging system, detection system, and autofocus system. However, the catadioptric designs and illumination systems employed differ from those previously available.

In the present design, laser light illuminates the sample from between the Mangin element and the sample using components located completely outside the objective. Illumination is achieved by the combination of a unique three surface Mangin element and beam delivery optics. In addition, a Fourier filter or other pupil aperture can be employed for the oblique laser dark-field mode. A detector with a suitable dynamic range may be employed in the detection system to handle the high dynamic range signals produced by the oblique dark-field inspection technique.

It should be particularly noted that the construction of objective elements as presented herein provides the beneficial performance desired. As is understood to those skilled in the art, one simply cannot take a currently available objective and obtain a reasonably performing objective having the performance discussed herein. It is the unique arrangement of elements provided herein that enable the performance discussed, such as NA, field size, and color performance, for example.

FIG. 1 illustrates one embodiment according to the present design. The design comprises a focusing lens group 101, a field lens group 102, and a catadioptric group 103. The focusing lens group 101 includes lenses 104-109. Light energy is received from the left side of FIG. 1. Intermediate image 111 is formed by focusing lens group 101. The design further includes field lens 110 in proximity to the focusing lens group 101 and intermediate image 111. The intermediate image 111 is formed in proximity to the vertex of Mangin element 112 in catadioptric group 103. The catadioptric group 103 comprises three elements including a Mangin element 112, lens element 113 used in triple pass, and a Mangin element 114. The three element arrangement for the catadioptric group 103 places the lens 113 between the Mangin element 112 and Mangin element 114.

One aspect of this design that allows for external oblique illumination is Mangin element 114 that has three optical surfaces 115, 116, and 117 located at different axial positions. Compared to prior catadioptric systems, the glass on this mangin element 114 closest to the specimen has been extended from surface 116 to surface 117. Note that surface 116 includes at least one mirrored portion. This extension 120 may be a section of a conically shaped lens or glass piece that can be formed separately or integrally formed with mangin element 114. Construction of this extension is discussed below. The marginal ray angle is reduced because of the index of the glass, allowing for surface 116 to be recessed while minimizing the increase of the central obscuration. The additional space between surface 116 and the sample 118 allows for laser illumination.

The manufacture of element 114 can be achieved by two primary methods. First, it can be made from a single piece of glass. This requires grinding and polishing away the glass in the outer portion between surface 116 and surface 117. Then the optical surface 116 is polished without impact to the glass portion between surface 116 and surface 117. An alternate method that simplifies manufacturing is to manufacture two separate glass components. One component is the glass portion bounded by surface 115 and surface 116. The second component is the glass portion bounded by surface 116 and surface 117. Both components can be attached to each other by optical contacting, gluing, or mechanical mounting.

Table 1 presents the lens prescriptions for the embodiment illustrated in FIG. 1.

TABLE 1

Lens Prescriptions for the design of FIG. 1

| Surf | Radius | Thickness | Glass | Diameter |
|---|---|---|---|---|
| OBJ | Infinity | Infinity | | 0.000 |
| 1 | 48.074 | 7.000 | Fused silica | 28.329 |
| 2 | −124.390 | 0.200 | | 27.298 |
| 3 | 27.722 | 5.000 | Fused silica | 25.287 |
| 4 | 55.105 | 12.681 | | 23.160 |
| 5 | −29.685 | 3.125 | Fused silica | 14.795 |
| 6 | 35.113 | 0.752 | | 13.353 |

TABLE 1-continued

Lens Prescriptions for the design of FIG. 1

| Surf | Radius | Thickness | Glass | Diameter |
|---|---|---|---|---|
| STO | Infinity | 0.930 | | 13.324 |
| 8 | −27.203 | 16.556 | Fused silica | 13.322 |
| 9 | −16.452 | 6.527 | | 15.724 |
| 10 | 37.067 | 5.000 | Fused silica | 12.788 |
| 11 | −30.197 | 0.500 | | 11.495 |
| 12 | 18.902 | 15.119 | Fused silica | 10.183 |
| 13 | −26.573 | 2.541 | | 2.759 |
| 14 | −22.314 | 3.750 | Fused silica | 5.052 |
| 15 | 55.522 | 14.667 | | 7.806 |
| 16 | 416.568 | 10.876 | Fused silica | 25.978 |
| 17 | 267.912 | 10.366 | | 34.041 |
| 18 | 158.105 | 7.500 | Fused silica | 57.000 |
| 19 | Infinity | −7.500 | MIRROR | 57.000 |
| 20 | 158.105 | −10.366 | | 57.000 |
| 21 | 267.912 | −10.876 | Fused silica | 74.000 |
| 22 | 416.568 | −14.667 | | 74.000 |
| 23 | 55.522 | 14.667 | MIRROR | 75.000 |
| 24 | 416.568 | 10.876 | Fused silica | 74.000 |
| 25 | 267.912 | 10.366 | | 74.000 |
| 26 | 158.105 | 7.500 | Fused silica | 57.000 |
| 27 | Infinity | 2.000 | Fused silica | 8.800 |
| 28 | Infinity | 1.000 | | 5.600 |
| IMA | Infinity | | | 1.008 |

As may be appreciated by one skilled in the art, the numbers in the leftmost column of Table 1 represent the surface number counting surfaces from the left of FIG. 1. For example, the left surface of lens 104 in the orientation presented in FIG. 1 (surface 1 in Table 1) has a radius of curvature of 48.074 mm, a thickness of 7.000 mm, and the rightmost surface (surface 2) has a radius of curvature of—124.390 mm, and is 0.2 mm from the next surface. The material used is fused silica.

In the design presented in FIG. 1, the numerical aperture may approach or even exceed approximately 0.9 in air. From FIG. 1, the focusing lens group 101 has the ability to receive light energy and transmit focused light energy. The field lens group 102 has the ability to receive the focused light energy and provide intermediate light energy, and form intermediate image 111. The catadioptric group or Mangin mirror arrangement 103 receives the intermediate energy and provides controlled light energy to the specimen 118. Alternately, the reflected path originates at the specimen, and light reflected from the specimen is received by the catadioptric group or Mangin mirror arrangement 103 and forms and transmits reflected light energy. The field lens group 102 receives the reflected light energy and transmitting resultant light energy, and the focusing lens group receives resultant light energy and transmits focused resultant light energy. An aperture or mask can be placed at the aperture stop 107 to limit or modify the NA of the objective.

The design presented in FIG. 1 and Table 1 thus uses a single glass material, fused silica. Other materials may be employed, but fused silica or any material used within the design may require low absorption over the range of wavelengths supported by the objective design. Fused silica offers relatively high transmission properties for light energy from 190 nm through the infrared wavelengths. Because of the single material design of the ultra-high NA objective, fused silica can enable the design to be re-optimized for any center wavelength in this wavelength range. For example, the design can be optimized for use with lasers at 193, 198.5, 213, 244, 248, 257, 266, 308, 325, 351, 355, or 364 nm. In addition, if calcium fluoride is employed as a glass or lens material, the design can be employed with an excimer laser operating at 157 nm. Re-optimization can require a slight tuning or altering of components, and may generally be within the abilities of those skilled in the art.

The design of FIG. 1 operates in the presence of light energy at a 266 nm wavelength with a 1 nm bandwidth and exhibits a field size of approximately 1.0 mm. Field size in this arrangement represents the size of the area on the specimen that can be imaged by the system with minimum degradation in optical performance. The design of FIG. 1 has a polychromatic Strehl Ratio of better than 0.96 across the field. Further correction of residual aberrations using additional imaging optics is also possible, where further correction can increase the optical specifications, including but not limited to bandwidth or field size. The maximum element diameter for the embodiment illustrated in FIG. 1 is approximately 75 mm.

The design of FIG. 1 is self corrected, where self corrected in this context means that the objective does not require any additional optical components to correct aberrations in order to achieve inspection design specifications. In other words, no additional components are needed to provide a generally aberration free image, or the objective provides substantially complete images without need for additional compensation. The ability to self correct can provide for simpler optical testing metrology and optical alignment to other self corrected imaging optics.

As is true with any optical design, certain tradeoffs may be made to improve performance characteristics depending on the desired application of the objective or optical design. It is possible, for example, to sacrifice bandwidth, field size, numerical aperture, and/or objective size to enhance one of the aforementioned performance characteristics, depending on the application. For example, optimizing for lower or higher NAs is possible. Reducing the NA can reduce the manufacturing tolerance and the outer diameter of the objective. Lower NA designs can provide larger field sizes and larger bandwidths. Lower NA designs with the same performance and less optical elements are also possible. Optimizing the design for higher NAs would generally limit the field size or bandwidth and may require slightly increased diameter objective elements. Thus it should be appreciated that the combination of performance characteristics for the present design is particularly noteworthy and has generally not been accomplished in known objective designs.

The design of FIG. 1 provides a relatively low intrinsic polychromatic wavefront aberration over the design bandwidth of 1 nm. The low wavefront aberration provides increased manufacturing headroom, or ease of manufacture, while enabling relatively high performance of the manufactured objective.

Figure 2:
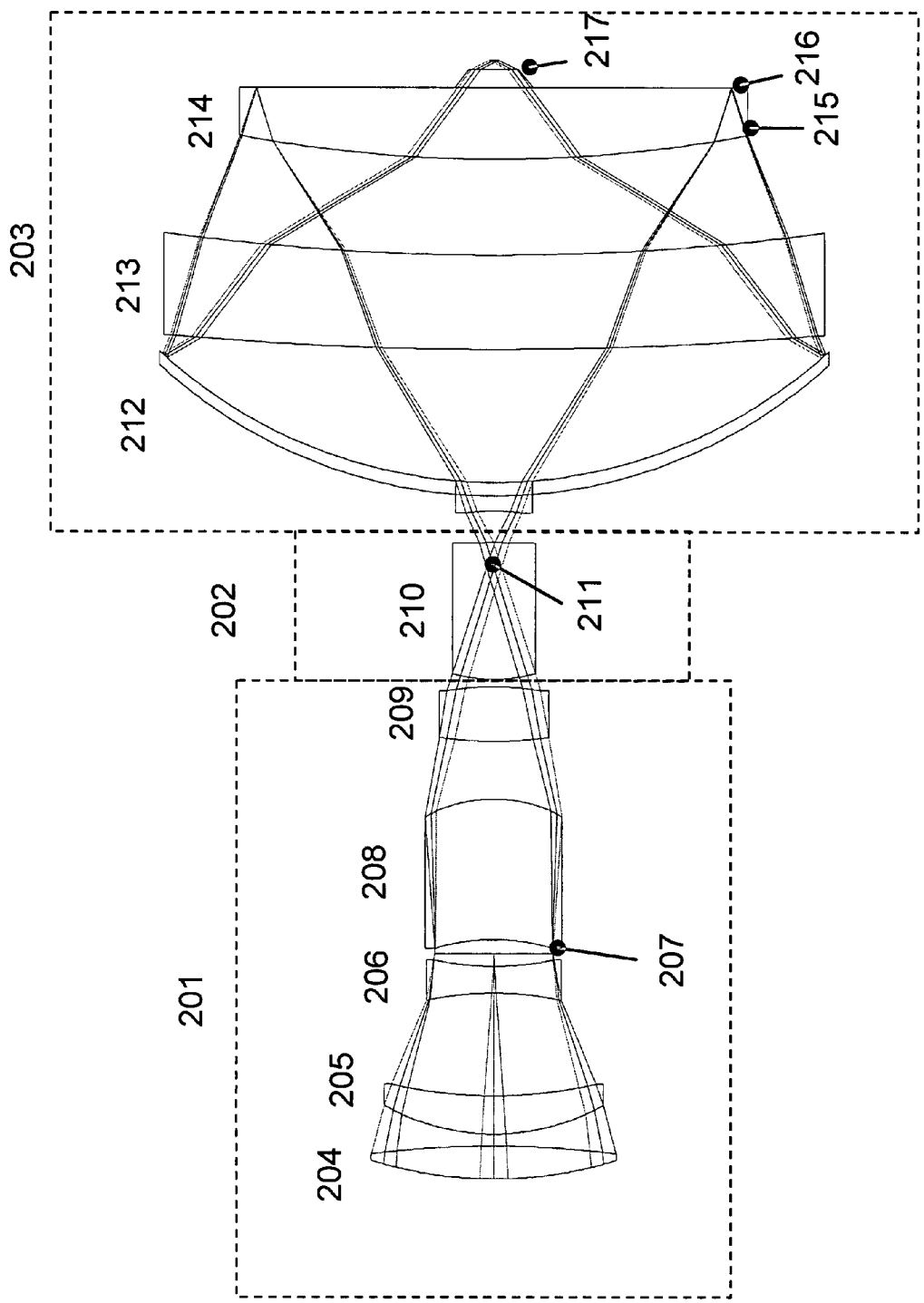
FIG. 2 is a catadioptric imaging system with a three surface Mangin element and 4 mm field suitable for use with external beam delivery.

FIG. 2 illustrates an alternate embodiment according to the present design. The design comprises a focusing lens group 201, a field lens group 202, and a catadioptric group 203. The focusing lens group 201 includes lenses 204-209. Light energy is received from the left side of FIG. 2. Intermediate image 211 is formed by focusing lens group 201. The design further includes field lens 210 in proximity to the focusing lens group 201 and intermediate image 211. The intermediate image 211 is formed in proximity to the vertex of Mangin element 212 in catadioptric group 203. The catadioptric group 203 comprises three elements including a Mangin element 212, lens element 213 used in triple pass, and a specially constructed Mangin element 214. The three element arrangement for the catadioptric group 203 places the lens 213 between the Mangin element 212 and Mangin element 214.

One unique aspect of this design that allows for external oblique illumination is Mangin element 214 that has three optical surfaces 215, 216, and 217 located at different axial positions. Again, the glass is extended from surface 216 to surface 217. The marginal ray angle is reduced because of the index of the glass, allowing for surface 216 to be recessed while minimizing the increase of the central obscuration. The additional space between mirror surface 216 and the sample 218 allows for laser (dark-field) illumination.

The manufacture of Mangin element 214 can be achieved by two primary methods. First, Mangin element 214 can be made from a single piece of glass. This requires grinding and polishing away the glass in the outer portion between surface 216 and surface 217. Then the optical surface 216 is polished without impact to the glass portion between surface 216 and surface 217. An alternate method that simplifies manufacturing is to manufacture two separate glass components. One component is the glass portion between surface 215 and surface 216. The second component is the glass portion between surface 216 and surface 217. Both components can then be attached to each other by optical contacting, gluing, or mechanical mounting.

Table 2 presents the lens prescriptions for the embodiment illustrated in FIG. 2.

TABLE 2

Lens Prescriptions for the design of FIG. 2

| Surf | Radius | Thickness | Glass | Diameter |
|---|---|---|---|---|
| OBJ | Infinity | Infinity |  | 0 |
| 1 | 69.946 | 5.520 | Fused silica | 41.477 |
| 2 | −170.865 | 2.059 |  | 41.192 |
| 3 | 38.047 | 6.365 | Fused silica | 36.986 |
| 4 | 77.759 | 17.149 |  | 34.509 |
| 5 | −52.635 | 4.557 | Fused silica | 22.771 |
| 6 | 49.426 | 2.055 |  | 20.313 |
| STO | Infinity | 2.447 |  | 19.985 |
| 8 | −34.982 | 23.228 | Fused silica | 19.910 |
| 9 | −23.859 | 9.566 |  | 23.094 |
| 10 | 65.121 | 9.128 | Fused silica | 18.467 |
| 11 | −49.033 | 1.229 |  | 15.893 |
| 12 | 25.987 | 22.672 | Fused silica | 13.907 |
| 13 | −41.324 | 5.255 |  | 5.005 |
| 14 | −31.594 | 4.794 | Fused silica | 9.369 |
| 15 | 83.960 | 21.975 |  | 12.988 |
| 16 | 648.066 | 15.477 | Fused silica | 111.000 |
| 17 | 422.582 | 15.921 |  | 111.000 |
| 18 | 240.231 | 11.854 | Fused silica | 85.500 |
| 19 | Infinity | −11.854 | MIRROR | 85.500 |
| 20 | 240.231 | −15.921 |  | 85.500 |
| 21 | 422.582 | −15.477 | Fused silica | 111.000 |
| 22 | 648.066 | −21.975 |  | 111.000 |
| 23 | 83.960 | 21.975 | MIRROR | 112.500 |
| 24 | 648.066 | 15.477 | Fused silica | 111.000 |
| 25 | 422.582 | 15.921 |  | 111.000 |
| 26 | 240.231 | 11.854 | Fused silica | 85.500 |
| 27 | Infinity | 3.000 | Fused silica | 13.200 |
| 28 | Infinity | 1.500 |  | 8.400 |
| IMA | Infinity |  |  | 2.000 |

In the design presented in FIG. 2, the numerical aperture may approach or even exceed approximately 0.9 in air. From FIG. 2, the focusing lens group 201 has the ability to receive light energy and transmit focused light energy. The field lens group 202 has the ability to receive the focused light energy and provide intermediate light energy, and form intermediate image 211. The catadioptric group or Mangin mirror arrangement 203 receives the intermediate energy and provides controlled light energy to the specimen (not shown in this view).

Alternately, the reflected path originates at the specimen, and light reflected from the specimen is received by the catadioptric group or Mangin mirror arrangement 203 and forms and transmits reflected light energy. The field lens group 202 receives the reflected light energy and transmitting resultant light energy, and the focusing lens group 201 receives resultant light energy and transmits focused resultant light energy. An aperture or mask can be placed at the aperture stop 207 to limit or modify the NA of the objective.

The design presented in FIG. 2 and Table 2 thus uses a single glass material, fused silica. Other materials may be employed as described in the embodiment shown in FIG. 1.

The design of FIG. 2 operates in the presence of light energy at a 266 nm wavelength with a 1 nm bandwidth and exhibits a field size of approximately 2.0 mm. Field size in this arrangement represents the size of the area on the specimen that can be imaged the system with minimum degradation in optical performance. The design of FIG. 2 has a polychromatic Strehl Ratio of better than 0.92 across the field. Further correction of residual aberrations using additional imaging optics is also possible, where further correction can increase the optical specifications, including but not limited to bandwidth or field size. The maximum element diameter for the embodiment shown in FIG. 2 is approximately 112.5 mm.

The design of FIG. 2 is self corrected, where self corrected in this context means that the objective does not require any additional optical components to correct aberrations in order to achieve inspection design specifications. In other words, no additional components are needed to provide a generally aberration free image, or the objective provides substantially complete images without need for additional compensation. The ability to self correct can provide for simpler optical testing metrology and optical alignment to other self corrected imaging optics.

The design of FIG. 2 provides a relatively low intrinsic polychromatic wavefront aberration over the design bandwidth of 1 nm. The low wavefront aberration provides increased manufacturing headroom, or ease of manufacture, while enabling relatively high performance of the manufactured objective.

Figure 3:
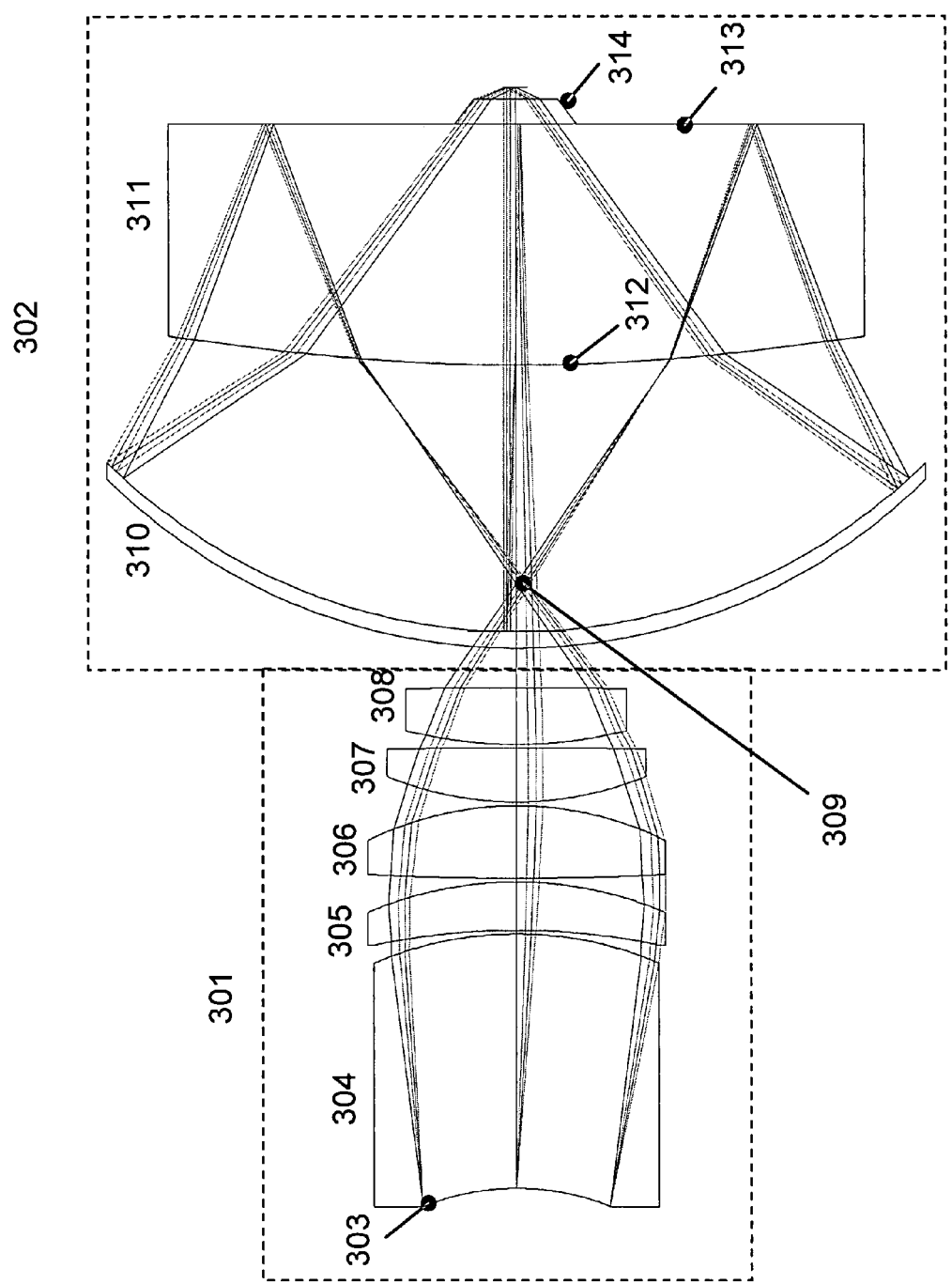
FIG. 3 is a catadioptric imaging system with a three surface Mangin element, 2 mm field, and one aspheric surface suitable for use with external beam delivery.

FIG. 3 illustrates an additional embodiment according to the present design. The design comprises a focusing lens group 301 and a catadioptric group 302. The focusing lens group 301 includes lenses 304-308. Light energy is received from the left side of FIG. 3. Intermediate image 309 is formed by focusing lens group 301. The intermediate image 309 is formed in proximity to the vertex of mirror element 310 in catadioptric group 302. The catadioptric group 302 comprises two elements including a mirror element 310 and a Mangin element 311.

This design allows for external oblique illumination using Mangin element 311 that has three optical surfaces 312, 313, and 314 located at different axial positions. Again, the glass of element 311 has been extended from surface 313 to 314. The marginal ray angle is reduced because of the index of the glass, allowing for surface 313 to be recessed while minimizing the increase of the central obscuration. The additional space between mirror surface 313 and the sample (not shown) allows for laser illumination. The protrusion or extension of element 311 may be a circular cross section, such as a conical cross section, or may be a tapered square, tapered rectangle, or have another shape.

Element 311 can be made from a single piece of glass. This requires grinding and polishing away the glass in the outer portion between surface 313 and surface 314. Then the optical surface 313 is polished without impact to the glass portion between surface 313 and surface 314. An alternate method is to manufacture two separate glass components. One component is the glass portion between surface 312 and surface 313. The second component is the glass portion between surface 313 and surface 314. Both components can be attached by optical contacting, gluing, or mechanical mounting.

Table 3 presents the lens prescriptions for the embodiment illustrated in FIG. 3.

TABLE 3

Lens Prescriptions for the design of FIG. 3

| Surf | Radius | Thickness | Glass | Diameter |
|---|---|---|---|---|
| OBJ | Infinity | Infinity | | 0.000 |
| STO | −20.829 | 0.000 | | 15.600 |
| 2 | −20.829 | 19.727 | Fused silica | 15.600 |
| 3 | −29.202 | 0.300 | | 23.422 |
| 4 | −57.732 | 3.960 | Fused silica | 23.722 |
| 5 | −30.687 | 0.300 | | 24.442 |
| 6 | 197.319 | 6.000 | Fused silica | 24.380 |
| 7 | −29.259 | 0.300 | | 24.218 |
| 8 | 30.478 | 4.455 | Fused silica | 21.318 |
| 9 | −228.692 | 0.300 | | 19.821 |
| 10 | 38.719 | 3.843 | Fused silica | 18.062 |
| 11 | −1820.769 | 4.602 | | 15.631 |
| 12 | Infinity | 21.428 | | 8.566 |
| 13 | 157.364 | 19.750 | Fused silica | 58.000 |
| 14 | Infinity | −19.750 | MIRROR | 58.000 |
| 15 | 157.364 | −21.428 | | 58.000 |
| 16 | 48.461 | 21.428 | MIRROR | 68.000 |
| 17 | 157.364 | 19.750 | Fused silica | 58.000 |
| 18 | Infinity | 2.000 | Fused silica | 10.000 |
| 19 | Infinity | 1.000 | | 6.800 |
| IMA | Infinity | | | 1.999 |

In the design presented in FIG. 3, surface 312 of Mangin element 311 has an aspheric shape. Many equations can be used to represent an aspheric shape. Equation (1) represents the aspheric surface for the lens prescription in Table 1.

$$z = \frac{cr^2}{1 + \sqrt{1 - (1+k)c^2 r^2}} + \sum_{i=1}^{N} \alpha_i \rho^{2i}, \quad (1)$$

where z is the sag or the distance from the surface to the plane tangent to the element vertex. The first expression represents the sag of a standard spherical surface where c is the surface curvature or the inverse of the radius of curvature. The parameter r can range from 0 to one half of the element diameter. The parameter k is the conic constant. For spherical surfaces, k is equal to 0. The aspheric terms are included in the summation of Equation (1). Here N is the number of aspheric terms, p is the normalized element radius (half of the element diameter), and a represents the aspheric coefficients.

Note that while a radius and thickness are provided in table 3 for surface 13, 15, and 17 (corresponding to 312 in FIG. 3) this surface is in fact aspheric and conforms to Equation (1) above. As used herein, while certain surfaces have radius and thickness associated therewith, those aspheric surfaces are specifically identified or called out and conform to Equation (1) according to the factors outlined herein.

For the design shown in FIG. 3, Table 4 lists the surface sag parameters for the surface 312 of the mangin element 311. Side 312 of element 311 is listed in Table 3 as surface(s) 13, 15, and 17. The side of an element has one surface entry in the table for each time light interacts with the element, and it should be noted that light contacts side 312 of element 311 three times.

TABLE 4

Aspheric surface parameters for the lens prescription in Table 3.

| | Surf 13, 15, 17 (side 312) |
|---|---|
| Conic constant (k) | 0 |
| Maximum half diameter (r) mm | 28 |
| Curvature (c) 1/mm | 0.006344 |
| $\alpha_1$ | .465816 |
| $\alpha_2$ | −0.84949 |
| $\alpha_3$ | 0.49517 |
| $\alpha_4$ | −0.23681 |
| $\alpha_5$ | −0.11226 |
| $\alpha_6$ | 0.246844 |
| $\alpha_7$ | −0.16928 |

In the design presented in FIG. 3, the numerical aperture may approach or even exceed approximately 0.9 in air. From FIG. 3, the focusing lens group 301 has the ability to receive light energy and transmit focused light energy and provide intermediate light energy, and form intermediate image 309. The catadioptric group or Mangin mirror arrangement 302 receives the intermediate energy and provides controlled light energy to the specimen 315. Alternately, such as during darkfield inspection, the reflected path originates at the specimen, and light reflected from the specimen is received by the catadioptric group or Mangin mirror arrangement 302 and forms and transmits reflected light energy. The focusing lens group receives resultant light energy and transmits focused resultant light energy. An aperture or mask can be placed at the aperture stop 303 to limit or modify the NA of the objective.

The design presented in FIG. 3 and Tables 3 and 4 thus uses a single glass material, fused silica. Other materials may be employed, but fused silica or any material used within the design may require low absorption over the range of wavelengths supported by the objective design. Fused silica offers relatively high transmission properties for light energy from 190 nm through the infrared wavelengths. Because of the single material design of the ultra-high NA objective, fused silica can enable the design to be re-optimized for any center wavelength in this wavelength range. For example, the design can be optimized for use with lasers at 193, 198.5, 213, 244, 248, 257, 266, 308, 325, 351, 355, or 364 nm. In addition, if calcium fluoride is employed as a glass or lens material, the design can be employed with an excimer laser operating at 157 nm. Re-optimization can require a slight tuning or altering of components, and may generally be within the abilities of those skilled in the art.

The design of FIG. 3 operates in the presence of light energy at a 266 nm wavelength and exhibits a field size of approximately 2.0 mm. Field size represents the size of the area on the specimen that can be imaged by the system with minimum degradation in optical performance. The design of FIG. 3 has a Strehl Ratio of better than 0.93 across the field. Further correction of residual aberrations using additional imaging optics or aspheric surfaces is also possible, where further correction can increase the optical specifications, including but not limited to bandwidth or field size. The maximum element diameter of the embodiment of FIG. 3 is approximately 68 mm.

The design of FIG. 3 is self corrected, where the objective does not require any additional optical components to correct aberrations in order to achieve inspection design specifications. In other words, no additional components are needed to provide a generally aberration free image, or the objective provides substantially complete images without need for additional compensation. As noted, the ability to self correct can provide for simpler optical testing metrology and optical alignment to other self corrected imaging optics.

The design of FIG. 3 provides a relatively low intrinsic wavefront aberration. The low wavefront aberration provides increased manufacturing headroom, or ease of manufacture, while enabling relatively high performance of the manufactured objective.

Figure 4:
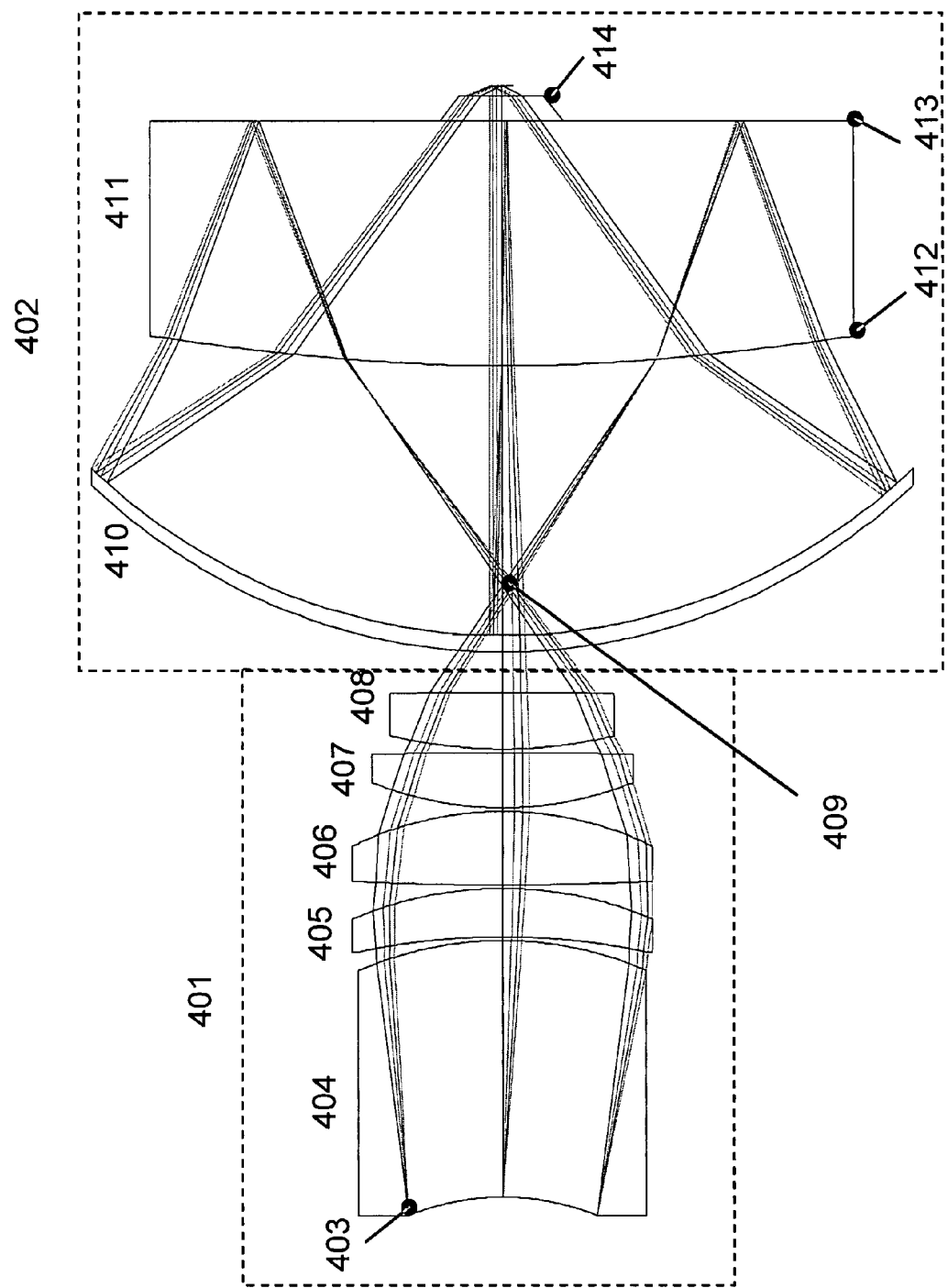
FIG. 4 is a catadioptric imaging system with a three surface Mangin element, 4 mm field, and one aspheric surface suitable for use with external beam delivery.

FIG. 4 illustrates yet another embodiment according to the present design. The design comprises a focusing lens group 401 and a catadioptric group 402. The focusing lens group 401 includes lenses 404-408. Light energy is received from the left side of FIG. 4. Intermediate image 409 is formed by focusing lens group 301. The intermediate image 409 is formed in proximity to the vertex of mirror element 410 in catadioptric group 402. The catadioptric group 402 comprises two elements including a mirror element 410 and a Mangin element 411.

One aspect of this design that allows for external oblique illumination is Mangin element 411 that has three optical surfaces 412, 413, and 414 located at different axial positions. Again, the glass has been extended from surface 413 to 414. The marginal ray angle is reduced because of the index of the glass, allowing for surface 413 to be recessed while minimizing the increase in central obscuration. The additional space between mirror surface 413 and the sample 415 allows for dark-field laser illumination.

As discussed with respect to previous embodiments, element 411 can be manufactured using two primary methods, but other methods may be employed. First, element 411 can be made from a single piece of glass by grinding and polishing away the glass in the outer portion between surface 413 and surface 414. Optical surface 413 can be polished without impact to the glass portion between surface 413 and surface 414. An alternate construction employs two separate glass components. One component is the glass portion between surface 412 and surface 413. The second component is the glass portion between surface 413 and surface 414, which again can take various shapes. Both components can then be attached to each other by optical contacting, gluing, or mechanical mounting.

Table 5 presents the lens prescriptions for the embodiment illustrated in FIG. 4.

TABLE 5

Lens Prescriptions for the design of FIG. 4

| Surf | Radius | Thickness | Glass | Diameter |
|---|---|---|---|---|
| OBJ | Infinity | Infinity | | 0.000 |
| STO | −42.538 | 0.000 | | 31.200 |
| 2 | −42.538 | 44.026 | Fused silica | 31.200 |
| 3 | −63.506 | 0.600 | | 48.496 |
| 4 | −142.907 | 7.920 | Fused silica | 49.189 |
| 5 | −74.335 | 0.600 | | 50.632 |
| 6 | 402.924 | 12.001 | Fused silica | 50.803 |
| 7 | −58.416 | 0.600 | | 50.680 |
| 8 | 63.617 | 8.910 | Fused silica | 44.682 |
| 9 | −447.503 | 0.600 | | 41.920 |
| 10 | 74.975 | 8.544 | Fused silica | 38.061 |
| 11 | −835.566 | 9.204 | | 32.810 |
| 12 | Infinity | 44.492 | | 18.055 |
| 13 | 301.277 | 39.395 | Fused silica | 116.000 |
| 14 | Infinity | −39.395 | MIRROR | 116.000 |
| 15 | 301.277 | −44.492 | | 116.000 |
| 16 | 98.947 | 44.492 | MIRROR | 138.040 |
| 17 | 301.277 | 39.395 | Fused silica | 116.000 |

TABLE 5-continued

Lens Prescriptions for the design of FIG. 4

| Surf | Radius | Thickness | Glass | Diameter |
|---|---|---|---|---|
| 18 | Infinity | 4.000 | Fused silica | 20.400 |
| 19 | Infinity | 1.750 | | 14.000 |
| IMA | Infinity | | | 3.982 |

In the design presented in FIG. 4, surface 412 of Mangin element 411 has an aspheric shape. The equation describing this surface is the same as the design of FIG. 3.

For the design shown in FIG. 4, Table 6 lists the surface sag parameters for the surface 412 of the mangin element 411. Side 412 of element 411 is listed in Table 5 as surface(s) 13, 15, and 17. The side of an element has one surface entry in the table for each time light interacts with the element, and light contacts side 412 of element 411 three times.

TABLE 6

Aspheric surface parameters for the lens prescription in Table 5.

| | Surf 13, 15, 17 (side 412) |
|---|---|
| Conic constant (k) | 0 |
| Maximum half diameter (r) mm | 46 |
| Curvature (c) 1/mm | 0.003319 |
| $\alpha_1$ | 0 |
| $\alpha_2$ | −0.506241 |
| $\alpha_3$ | 0.17569 |
| $\alpha_4$ | −0.049301 |
| $\alpha_5$ | −0.005411 |
| $\alpha_6$ | 0.0101692 |
| $\alpha_7$ | −0.00451 |
| $\alpha_8$ | −7.67E−36 |

In the design presented in FIG. 4, the numerical aperture may approach or even exceed approximately 0.9 in air. From FIG. 4, the focusing lens group 401 has the ability to receive light energy and transmit focused light energy and provide intermediate light energy, and form intermediate image 409. The catadioptric group or Mangin mirror arrangement 402 receives the intermediate energy and provides controlled light energy to the specimen 415. Alternately, the reflected path originates at the specimen, and light reflected from the specimen is received by the catadioptric group or Mangin mirror arrangement 402 and forms and transmits reflected light energy. The focusing lens group receives resultant light energy and transmits focused resultant light energy. An aperture or mask can be placed at the aperture stop 403 to limit or modify the NA of the objective.

The design presented in FIG. 4 and Tables 5 and 6 thus uses a single glass material, fused silica. Other materials may be employed, as described with respect to embodiment illustrated in FIG. 3.

The design of FIG. 4 operates in the presence of light energy at a 266 nm wavelength and exhibits a field size of approximately 4.0 mm, where field size is the size of the area on the specimen that can be imaged the system with minimum degradation in optical performance. The design of FIG. 4 has a polychromatic Strehl Ratio of better than 0.8 across the field. Further correction of residual aberrations using additional imaging optics or aspheric surfaces is also possible, where further correction can increase the optical specifications, including but not limited to bandwidth or field size. The maximum element diameter for this design is approximately 138 mm.

The design of FIG. 4 is self corrected, meaning that the objective does not require any additional optical components to correct aberrations in order to achieve inspection design specifications. In other words, no additional components are needed to provide a generally aberration free image, or the objective provides substantially complete images without need for additional compensation.

The design of FIG. 4 provides a relatively low intrinsic wavefront aberration. The low wavefront aberration provides increased manufacturing headroom, or ease of manufacture, while enabling relatively high performance of the manufactured objective.

Figure 5:
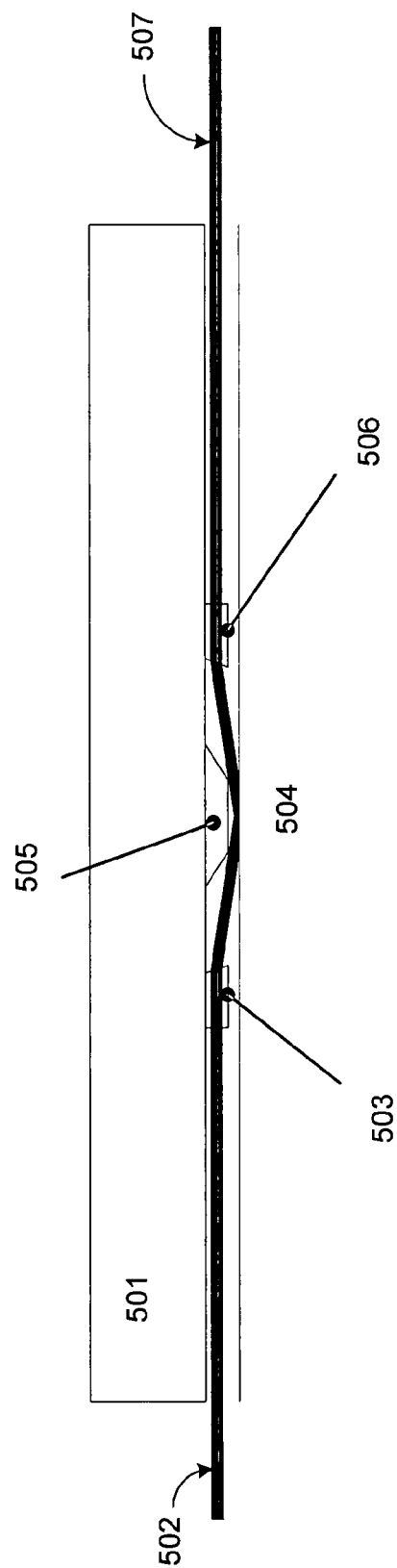
FIG. 5 is a side view of a beam delivery system using prisms input and output beams at zero degrees to the plane of incidence.

The present design employs a specific illumination beam delivery system, specifically for dark-field illumination. FIG. 5 shows an example beam delivery system, illustrating a cross sectional view of a beam delivery system using prisms. In this design, a laser beam 502 enters between Mangin element 501 and sample 504. Mangin element 501 is shown conceptually and is not to scale nor do the surfaces reflect actual curvature of Mangin element 501. The laser beam 502 passes through prism 503 which redirects the illuminating beam at the desired angle. The position and output surface angle of the prism are such that the illuminating beam is, at a desired angle and does not touch the extended portion 505 of Mangin element 501. The specularly reflected beam from sample 504 is similarly refracted by prism 506 and the beam is redirected away from the objective as beam 507.

The input and output surfaces of the prism may be coated with an anti-reflection coating to minimize losses due to reflected light. The prisms may be mounted to the underside of the Mangin element 501. Alternately, the prisms 503 and 506 can be mounted to a plate or support that is adjacent to, proximate, or mounted against mangin element 501, where such a plate would enable normal operation and likely be open, notched, or slotted to accommodate extension 505. Use of such a plate, not shown in FIG. 5, allows for fine alignment by rotating and tilting of the plate. In addition, if one of the prisms 503 or 506 is damaged, the plate (not shown) can be removed and a new plate and set of prisms installed.

Figure 6:
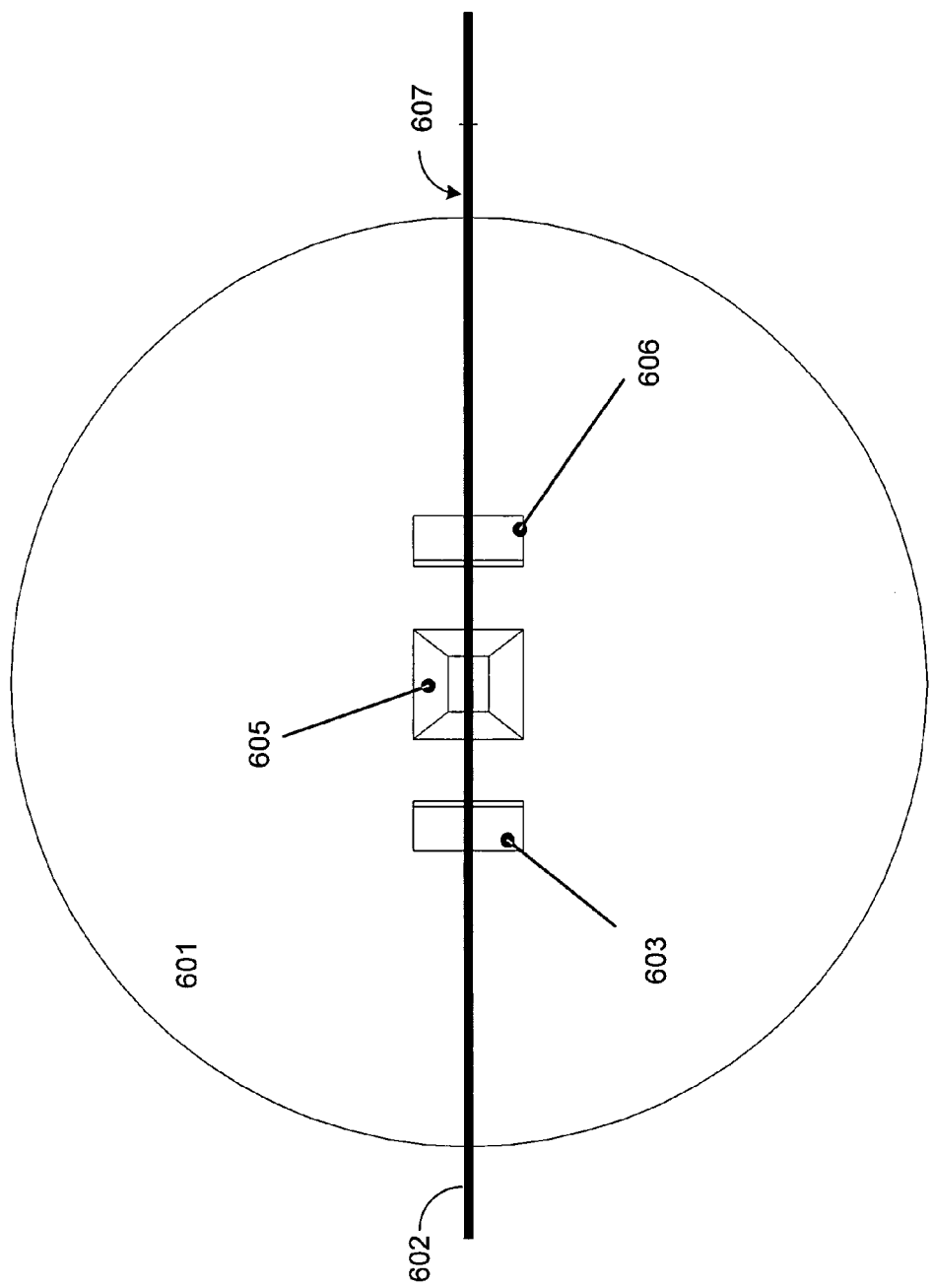
FIG. 6 is a bottom view of a beam delivery system using prisms input and output beams at zero degrees to the plane of incidence.

FIG. 6 shows a bottom view of the beam delivery system presented in FIG. 5. Here the incident laser beam 602 goes between the Mangin element 601 and the sample (not shown). The laser then passes through prism 603 which redirects the illuminating beam to the desired angle. The position and output surface angle of the prism are chosen such that the illuminating beam is at the desired angle and does not touch the extended portion 605 of Mangin element 601. Note that in this view, the extension or extended portion 605 comprises a square or substantially square base proximate the Mangin element 601, tapering to a rectangular lens surface. As described, other shapes may be employed for the extension 605. The specularly reflected beam from the sample is similarly refracted by prism 606 and the beam is redirected away from the objective 607. In this embodiment the illuminating laser and specularly reflected beam are at an angle of approximately zero degrees to the plane of incidence.

Figure 7:
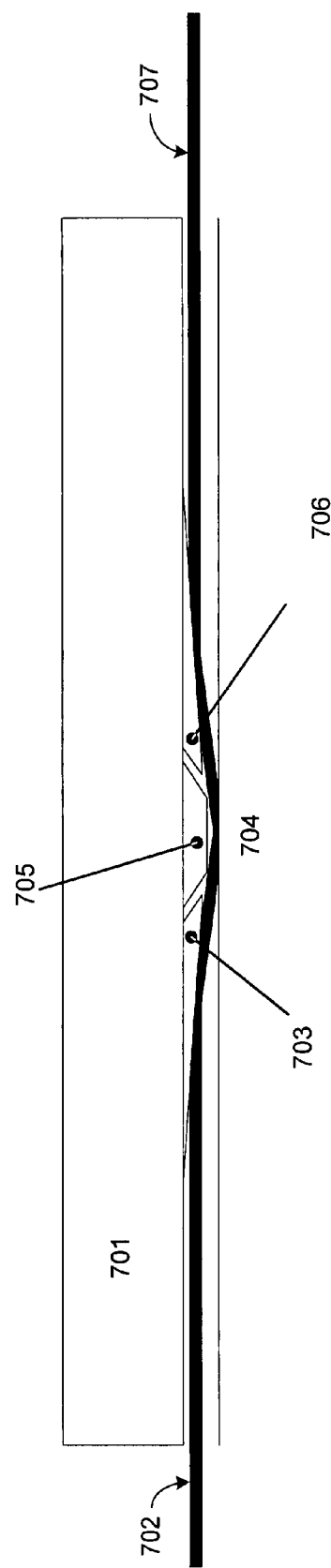
FIG. 7 is a side view of a beam delivery system using mirrors with input and output beams at zero degrees to the plane of incidence.

Another embodiment of the illumination beam delivery system is shown in FIG. 7. FIG. 7 shows a cross sectional view of a beam delivery system using mirrors. In this system, laser beam 702 enters between Mangin element 701 and sample 704. The laser beam 702 then reflects off mirror 703, which redirects the illuminating beam to the desired angle. The position and angle of mirror surface are chosen such that the illuminating beam is at a desired angle and does not touch the extension/extended portion 705 of Mangin element 701. The specularly reflected beam from sample 704 is similarly reflected by mirror 706 and the beam is redirected away from the objective as beam 707. Note that as with FIG. 5, the dark-field laser beam can be provided from one side of the Mangin element 701, two such beams can be applied both sides of the Mangin element 701, and the position around the periphery of Mangin element 701 where the dark field laser beam or beams originate can vary as long as the redirecting mechanism, such as the prisms or mirrors or other devices can accommodate the laser beam or beams and direct energy toward the specimen in a desired orientation.

The mirror coating of the reflective surfaces 703 and 706 may be a metal overcoated with a dielectric, or a pure dielectric coating. The mirrors or reflective surfaces 703 and 706 may be mounted to the underside of the Mangin element 701, where again Mangin element 701 is represented by a portion of the full element and the drawing is not to scale. Alternately, the reflective surfaces 703 and 706 can be mounted to a plate fabricated to accommodate the components and desired light beam paths, where such a plate (not shown) is mounted against, adjoining, or proximate Mangin element 701. Such a plate may be transparent or may be opaque or partially opaque, and again accommodates the beam path(s) and components, including extension 705, illustrated and/or desired. Use of such a plate allows for fine alignment of the mirrors and beams by rotating and tilting the plate (not shown in FIG. 7). In addition, if one of the mirrors is damaged, the plate can be removed and a new plate and set of mirrors installed.

Figure 8:
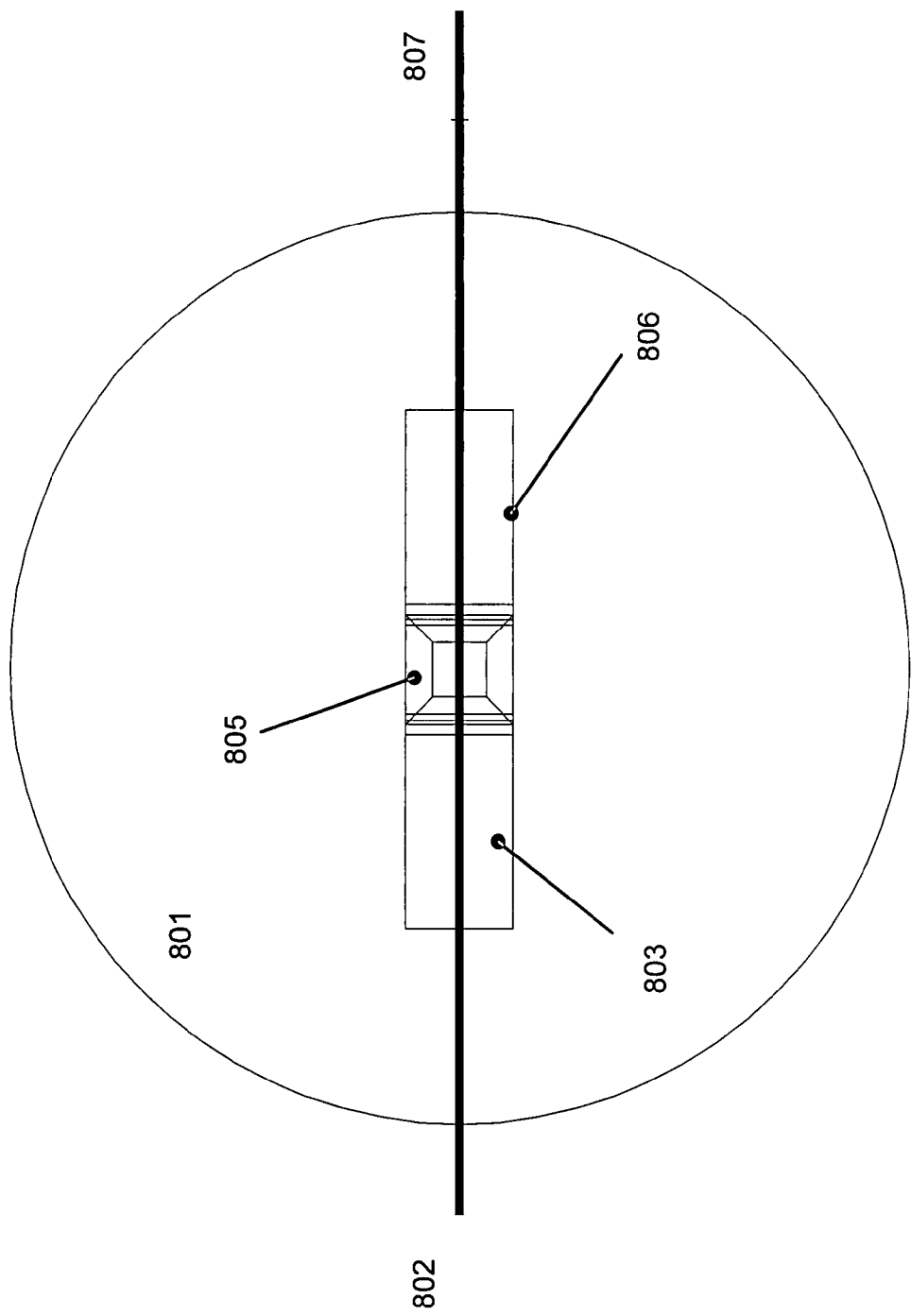
FIG. 8 is a bottom view of a beam delivery system using mirrors with input and output beams at zero degrees to the plane of incidence.

FIG. 8 shows a bottom view of the beam delivery system presented in FIG. 7. Here the incident laser beam 802 goes between the Mangin element 801 and the sample (not shown). The laser beam 802 then reflects off mirror 803 which redirects the illuminating beam to the desired angle. The position and angle of the mirror(s) are chosen such that the illuminating beam is at the desired angle and does not contact or touch the extended portion 805 of Mangin element 801. The specularly reflected beam from the sample is similarly refracted by mirror 806 and the beam is redirected away from the objective 807. In this embodiment the illuminating laser and specularly reflected beam are at an angle of approximately zero degrees to the plane of incidence. As noted, various designs for the extension 805 may be employed while demonstrating the functionality described herein.

Figure 9:
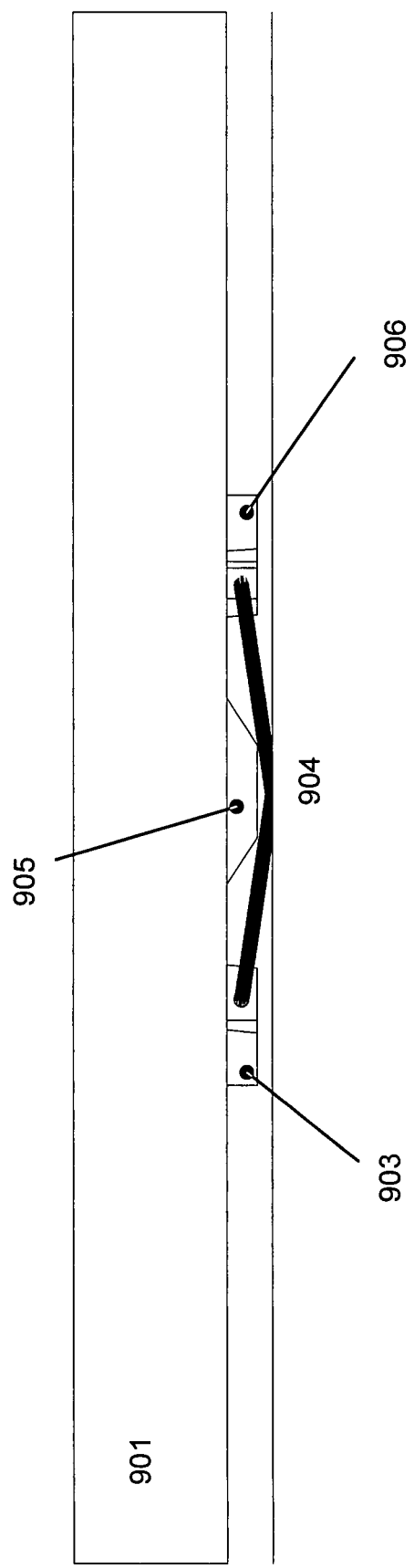
FIG. 9 is a side view of a beam delivery system using mirrors with input and output beams at 45 degrees to the plane of incidence.
Figure 10:
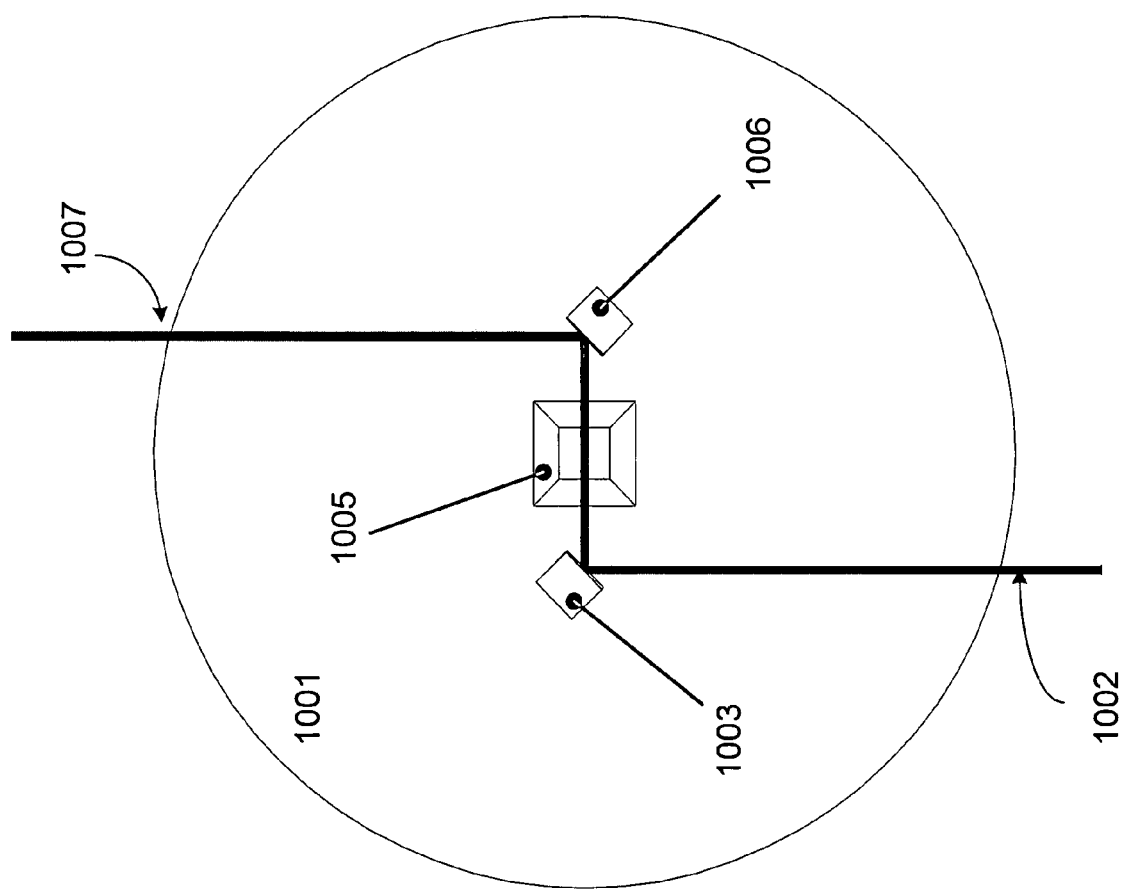
FIG. 10 is a bottom view of a beam delivery system using mirrors with input and output beams at 45 degrees to the plane of incidence.

An additional embodiment of the illumination beam delivery system is shown in FIG. 9. FIG. 9, in conjunction with FIG. 10, shows a cross sectional view of a beam delivery system using mirrors. In this system, a laser beam enters between Mangin element 901 and sample 904. Mangin element 901 again represents the Mangin element, where other embodiments illustrate Mangin element dimensions. The laser beam reflects off mirror 903 which redirects the illuminating beam to the desired angle. The position and angle of mirror surfaces are chosen such that the illuminating beam is at the desired angle and does not contact or touch the extended portion 905 of Mangin element 901. The specularly reflected beam from sample 904 is similarly reflected by mirror 906 and the beam is redirected away from the objective 907. The mirror can be coated and mounted in a similar manner to the system in FIGS. 7 and 8.

In the case of the design shown in FIGS. 9 and 10, the incident beam is at approximately 45 degrees relative to the plane of incidence for the illumination. This geometry reduces the high incident angles required for the beam delivery systems shown in FIGS. 7 and 8.

FIG. 10 shows a bottom view of the beam delivery system presented in FIG. 9. Here, the incident laser beam 1002 goes between the Mangin element 1001 and the sample (not shown). The incident beam is at approximately 90 degrees relative to the plane of incidence for the illumination light.

The incident laser beam 1002 then reflects off mirror 1003 which redirects the illuminating beam at the desired angle. The position and angle of the mirror are chosen such that the illuminating beam is at the desired angle and does not touch the extended portion or extension 1005 of Mangin element 1001. The specularly reflected beam from the sample is similarly refracted by mirror 1006 and the beam 1007 is redirected away from the objective at approximately 90 degrees relative to the plane of incidence for the illumination light.

The design presented herein and the specific aspects illustrated are meant not to be limiting, but may include alternate components while still incorporating the teachings and benefits of the invention. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A catadioptric objective configured to inspect a specimen, comprising:
   a plurality of lenses;
   a Mangin element comprising one essentially flat inwardly reflective surface at a first axial location, wherein inwardly reflective represents reflection away from the specimen; and
   a glass extension lens element attached to the Mangin element, wherein the extension lens element is a truncated cone shaped section having a base attached to the Mangin element and a second flat substantially transparent surface at a second axial location, wherein the second axial location is closer to the specimen than the first axial location;
   wherein light energy reflected from the specimen passes in order to the second flat substantially transparent surface of the glass extension lens element, the base, the Mangin element, and through the plurality of lenses.

2. The catadioptric objective of claim 1, wherein the Mangin element is separately formed from the glass extension lens element.

3. The catadioptric objective of claim 2, wherein the Mangin element and the glass extension lens element are positioned together using optical contacting.

4. The catadioptric objective of claim 2, wherein the Mangin element and the glass extension lens element are positioned together using glue.

5. The catadioptric objective of claim 2, wherein the Mangin element and the glass extension lens element are positioned together using mechanical mounting.

6. The catadioptric objective of claim 1 wherein at least one surface of the lenses and Mangin element is aspheric.

7. The catadioptric objective of claim 1, wherein the objective is configured to be employed with a beam delivery system external to the objective and in proximity to the Mangin element and deliver a beam to the specimen.

8. The catadioptric objective of claim 7, wherein the beam is directed to the specimen via prisms.

9. The catadioptric objective of claim 7, wherein the beam is directed to the specimen via reflective surfaces.

10. The catadioptric objective of claim 7, wherein the beam is directed by beam directing elements attached to the Mangin element.

11. The catadioptric objective of claim 7, wherein the beam is directed by beam directing elements supported on a surface formed separately from the Mangin element.

12. A catadioptric objective configured to inspect a specimen, comprising:
    a plurality of lenses;
    a Mangin element comprising one essentially flat inwardly reflective surface at a first axial location, wherein inwardly reflective represents reflection away from the specimen; and
    a glass extension lens element attached to the Mangin element, wherein the glass extension lens element is a truncated cone shaped section having a base attached to the Mangin element and a second flat substantially transparent surface at a second axial location, wherein the second axial location is closer to the specimen than the first axial location such that light energy reflected from the specimen passes in order to the second flat substantially transparent surface of the glass extension lens element, the base, and the Mangin element.

13. The catadioptric objective of claim 12, wherein the Mangin element is separately formed from the glass extension lens element.

14. The catadioptric objective of claim 13, wherein the Mangin element and the glass extension lens element are positioned together using optical contacting.

15. The catadioptric objective of claim 13, wherein the Mangin lens element and the glass extension element are positioned together using glue.

16. The catadioptric objective of claim 13, wherein the Mangin element and the glass extension lens element are positioned together using mechanical mounting.

17. The catadioptric objective of claim 12 wherein at least one surface of the lenses and Mangin element is aspheric.

18. The catadioptric objective of claim 12, wherein the objective is configured to be employed with a beam delivery system external to the objective and in proximity to the Mangin element and deliver a beam to the specimen.

19. The catadioptric objective of claim 18, wherein the beam is directed to the specimen via prisms.

20. The catadioptric objective of claim 18, wherein the beam is directed to the specimen via reflective surfaces.

21. The catadioptric objective of claim 18, wherein the beam is directed by beam directing elements attached to the Mangin element.

22. The catadioptric objective of claim 18, wherein the beam is directed by beam directing elements supported on a surface formed separately from the Mangin element.

23. A catadioptric objective configured to inspect a specimen, comprising:
    a plurality of lenses;
    a Mangin element comprising one essentially flat inwardly reflective surface at a first axial location, wherein inwardly reflective represents reflection away from the specimen; and
    a glass extension lens element attached to the Mangin element, wherein the glass extension lens element is a truncated cone shaped section having a base attached to the Mangin element and a second flat substantially transparent surface at a second axial location, wherein the second axial location is closer to the specimen than the first axial location such that light energy reflected from the specimen passes to the second flat substantially transparent surface of the glass extension lens element and subsequently to the base.

24. The catadioptric objective of claim 23, wherein the Mangin element is separately formed from the glass extension lens element.

25. The catadioptric objective of claim 23, wherein the Mangin element and the glass extension lens element are positioned together using adhesive.

26. The catadioptric objective of claim 23, wherein the objective is configured to be employed with a beam delivery system external to the objective and in proximity to the Mangin element and deliver light energy through the catadioptric objective and to the specimen.

* * * * *